United States Patent [19]

Hakansson

[11] Patent Number: 4,898,566
[45] Date of Patent: Feb. 6, 1990

[54] OVERLOAD-PROTECTED TORQUE TRANSMITTING TELESCOPIC SHAFT

[75] Inventor: Olle Hakansson, Eskilstuna, Sweden

[73] Assignee: FFV Autotech Aktiebolag, Eskilstuna, Sweden

[21] Appl. No.: 146,207

[22] Filed: Jan. 20, 1988

[30] Foreign Application Priority Data

Mar. 12, 1987 [SE] Sweden .............................. 8701041

[51] Int. Cl.⁴ ............................................. F16C 3/03
[52] U.S. Cl. ........................................ 464/167; 74/492
[58] Field of Search ...................... 74/492; 384/10, 25, 384/53, 54, 56, 57; 403/383; 464/30, 34, 35, 160, 162, 167, 180

[56] References Cited

U.S. PATENT DOCUMENTS

| | | | |
|---|---|---|---|
| 3,318,170 | 5/1967 | Runkle | 464/167 X |
| 3,434,369 | 3/1969 | Runkle | 464/167 X |
| 3,473,406 | 10/1969 | Runkle | 464/162 X |
| 3,808,838 | 5/1974 | Bowen et al. | 74/492 X |
| 4,075,872 | 2/1978 | Geisthoff | 464/167 |
| 4,269,043 | 5/1981 | Kizu et al. | 74/492 X |

FOREIGN PATENT DOCUMENTS 2656822 6/1978 Fed. Rep. of Germany .

Primary Examiner—Daniel P. Stodola

[57] ABSTRACT

Torque transmitting telescopic apparatus comprising a shaft (1) and a sleeve (2) axially displacable relative to each other and interconnected for rotation in common to transmit torque, in which the sleeve has a polygonal bore cross-section and the shaft has a corresponding polygonal cross-section. The bore and shaft cross-sections are respectively defined by pairs of cooperating surfaces. One surface in each of the pairs has at least three sections including a central section defining a groove (4), narrower than the other cooperating surface of the pair, and outer sections (5,6). A rolling element assembly disposed within each groove (4) is restrained against axial movement relative to at least one of the members comprising the shaft and the sleeve and includes a bed, a plurality of rolling elements and a plate spring. The rolling element assemblies couple the shaft and sleeve for play-free axial translation and torque transmission. At least one of the outer sections (5,6) engages an associated cooperating surface (9) when applied torque exceeds a predetermined magnitude.

9 Claims, 3 Drawing Sheets

OVERLOAD-PROTECTED TORQUE TRANSMITTING TELESCOPIC SHAFT

The present invention generally relates to a torque transmitting telescopically operating apparatus, in particular an apparatus comprising a shaft and a sleeve which are displacable in relation to each other and which are rotatably interconnected to enable a torque transmittance therebetween. The invention has especially been developed as the solution the problems, associated with steering wheel columns for motor cars, of minimizing friction as possible during axial displacement of the shaft in relation to the sleeve, providing play-free torque transmittance between the shaft and the sleeve, and at the same time eliminating the risk of overload of the machine elements included in the telescopic apparatus.

Telescopically operating guides can be formed for direct sliding friction, as in the special case of "the spline connection", or with friction reducing means between the shaft and the sleeve, particularly slide bearings or roller bearings.

Telescopic guides operating solely with sliding connection have a relatively great axial friction, especially if the guide parts are formed with small tolerances to reduce play during the torque transmittance, or vice versa relatively great play during the torque transmittance in case a relatively little axial friction is intended. Irrespective of how the guide parts are formed play occurs after some time due to wear. The known apparatus also is subjected to a substantial wear and generally provides a stiff and rough torque transmittance contact.

Several types of telescopic guides having friction reducing means which are based either on the sliding principle or on the rolling principle.

Telescopic joints of the slide friction type are often formed with slide bearings which are placed between the shaft and the sleeve and which are fixed to the shaft or to the sleeve. The slide bearings become worn in time, and as a consequence play appears in the joint. The joints may also be so stiff that the joint parts may be damaged if temporarily overloaded in the radial direction.

Telescopic joints of the rolling type, in turn, are generally formed with balls or rollers which are placed between shaft and sleeve parts that are displacable in relation to each other.

The German patent publication DE-OS-26 56 822 discloses several different solutions to the problem minimizing axial friction and play during the torque transmittance. In most of the illustrated examples axial guide paths or guide beds for balls are provided in the shaft part or the sleeve part, or both, which guide paths are located as far from each other as possible, preferably at the edges or corners of shafts and sleeves having a substantially polygonal cross section, for instance a square, a rectangular, a triangular cross section etc.

In order to eliminate the problems arising from a too stiff torque transmittance the ball guide paths are, in some of the examples, formed with layers of an elastic material in the form of an intermediate layer between the transmitting balls and the ball paths.

In said previously known roller friction apparatus the balls themselves transmit the entire torque and therefore there is a risk that both the balls and the ball paths may be damaged in case of an overload. Such damage causes increased friction and increased pressure etc. upon axially mutually displacable parts and an increased play during the torque transmittance.

The object of the invention therefore is to solve the problem of providing a telescopic guide having the ability to transmit torque, with minimals an optimum low resistance upon telescoping of the parts, minimal play during torque transmittance, a reduced risk of damages due to overload and minimal wear during long use.

According to the invention the sleeve and/or the shaft, at each pair of cooperating sides of a sleeve and shaft device having a polygonal cross section shape, are/is formed with at least three portions, namely a central portion or groove, against or in which rollers or balls are in rolling contact for transmitting normal torque loads between the shaft and the sleeve, and at least one outer portion on each side of said central groove portion adapted to receive exceptionally large loads between the shaft and the sleeve by providing a direct contact between said shaft and sleeve.

The rollers or balls preferably are spring biassed to reduce play upon torque transmittance of normal forces and to reduce wear and the risk of damage to the cooperating shaft and sleeve surfaces. The rollers or balls may for the purpose be mounted in roller or ball carriers which are slidable in relation to a rolling path or bed such as a spring plate or a contact surface which is spring biased in any suitable way.

Further characteristics of the invention and advantages thereof will be evident from the following detailed specification in which reference will be made to the accompanying drawings.

It is, however, to be understood that the illustrated and described embodiments of the invention are only illustrating examples and that many different variations may be rpesented within the scope of the appended claims.

In the drawings

Figure 1:
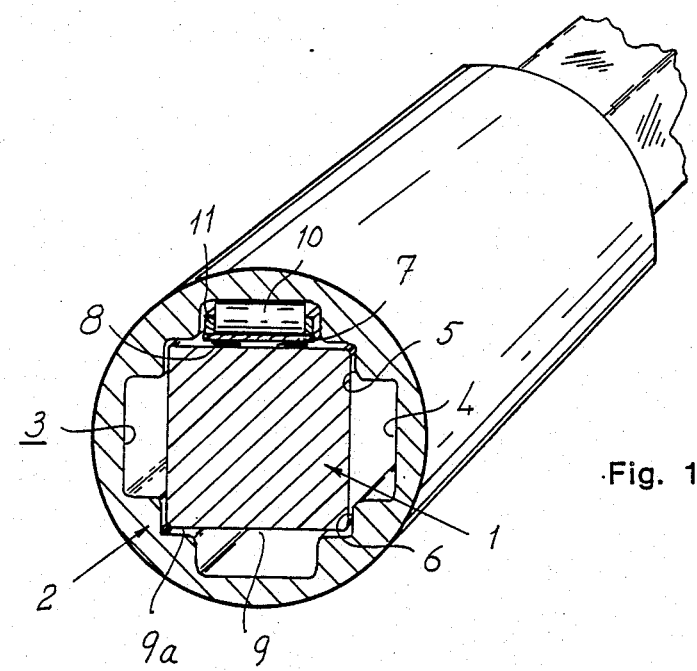
FIG. 1 is a fragmentary perspective view shown partially in cross section through a telescopic guide according to the invention having a substantially square shaft and correspondingly shaped guide grooves in the sleeve.
Figure 2:
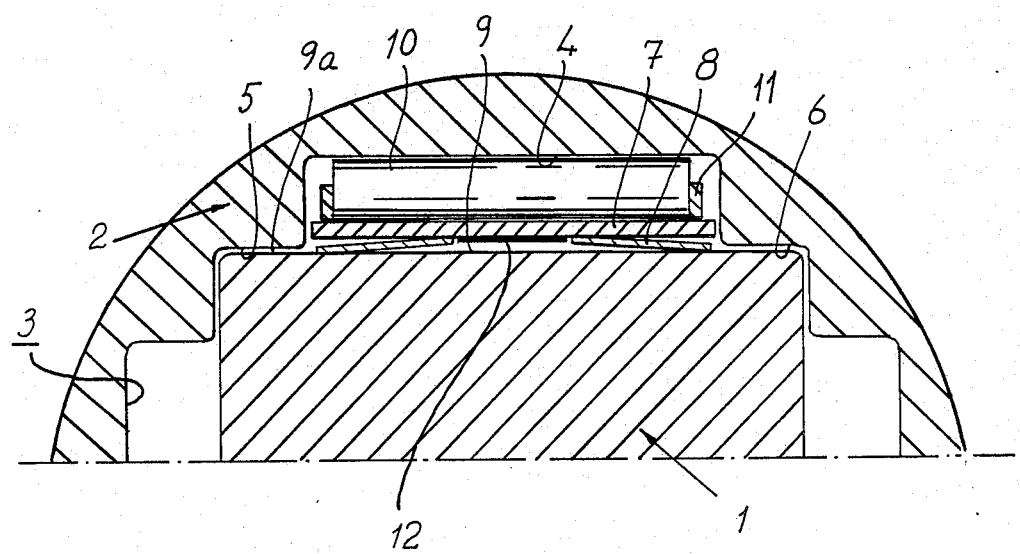
FIG. 2 shows a detail of the apparatus of FIG. 1 in an enlarged scale.

The apparatus shown in FIGS. 1 and 2 generally comprises a shaft 1 having a substantially square cross section and a sleeve 2 having a through bore 3 matching said shaft 1. The bore 3 of the sleeve provides, for each surface of the shaft 1, a central radially outwards facing groove 4 adapted to accommodate a rolling means between the shaft and the sleeve. For the sake of clearness such rolling means is shown only in one of the grooves 4. On each side of the central groove 4 each cooperative surface of the sleeve provides carrier surfaces 5 and 6, respectively, adapted to move into direct contact with the outermost surface parts of the shaft 1 in case of an excessively large load on the telescopic guide.

As best shown in FIG. 2 each rolling means is in the form of a rolling bed 7, supported by plate springs 8 or other known spring means in contact with the guide surface 9 of the shaft, and on which several rollers 10 are adapted to roll in contact with the guide surface of the enlongated groove 4. The rollers 10 are maintained in a given order by means of a roller carrier 11.

Any axial displacement of the shaft 1 in relation to the sleeve 2 is made under a rolling contact with very little friction, and upon a rotation of the unit comprising the shaft and the sleeve for the purpose of transmitting torques the rollers 10 cooperate with the rolling bed 7 and its springs 8 which assure that any play is eliminated. The same thing happens upon rotation and simultaneous telescoping of the shaft and sleeve.

The spring forces are calculated considering the normal torque to be transmitted and so that any contact between the shaft and the sleeve is made through the rollers 10. In case of an overloaded rotation of the shaft in relation to the sleeve, or vice versa, the springs are compressed and the the edge parts 9a shaft guide surfaces 9 thereby comes into contact with the carrier surfaces 5 and 6 of the sleeve to protect the groove 4 and the rollers 10 against damages from overload.

Figure 3:
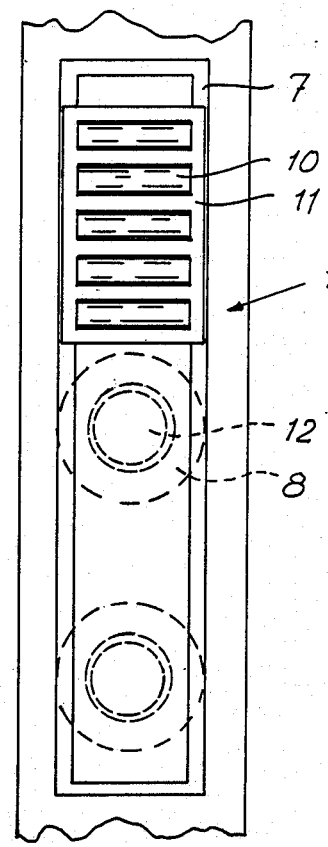
FIG. 3 shows details of the apparatus of FIG. 1 in a plan view.

FIG. 3 separately shows a rolling means having a rolling bed 7, plate springs 8, rollers 10 and a roller carrier 11. The plate springs 8 can be maintained correctly positioned by means of diagrammatically indicated pins 12 provided at suitable distances from each other at the bottom surface of the rolling bed 7.

It is possible to provide several separate roller grooves and several carrier surfaces parallel to each other, so that the groove for the rollers 10 can be provided in the sleeve, as shown in FIGS. 1 and 2, or alternatively in the shaft, or in both, so that the shaft and the sleeve may have cooperating groove portions.

Figure 4:
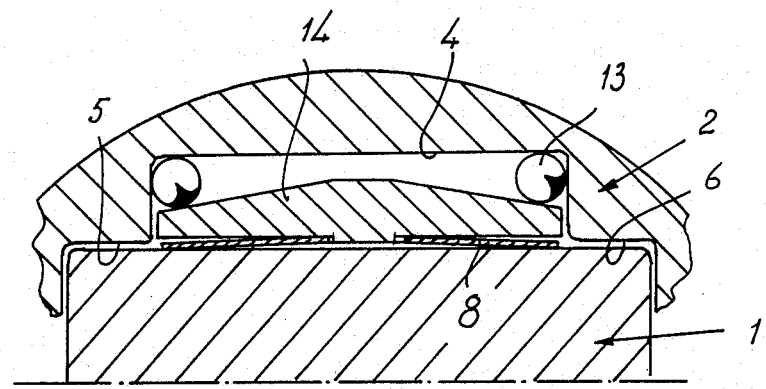
FIGS. 4 and 5 show, in the same way as in FIG. 2, alternative embodiments of the invention, and FIGS. 6 and 7 diagrammatically show further modified embodiments of the invention.

FIG. 4 shows an alternative embodiment of the telescopic guide according to the invention in which the rolling means comprises balls instead of rollers. The balls 13 are mounted in a ball carrier (not shown) and each ball is, by a radially outwards biassed conical ball path or bed 14, biassed into contact with the groove 4 at two points, that is a point at the inner surface and a point at the side surface of the groove 4. The function is the same as in the apparatus according to FIGS. 1-3.

Figure 5:
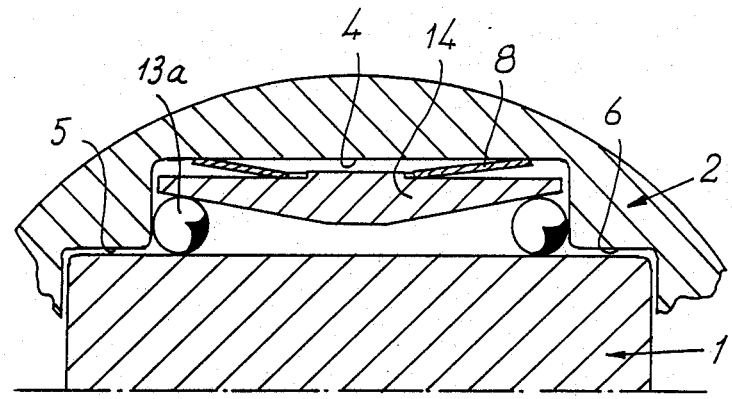

FIG. 5 shows a modified embodiment of the telescopic guide which differs from the guide of FIG. 4 in that the guide balls 13a are facing inwardly toward the shaft 1 instead of outwardly toward the sleeve groove 4.

Figure 6:
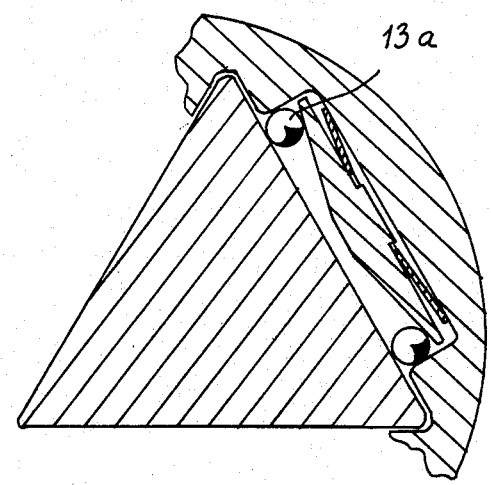

FIG. 6 diagrammatically shows an embodiment of the telescopic guide which is of the same basic structure as the previously described guides, but in which the shaft and the sleeve respectively have a triangular cross section form. It is obvious that said cross section form can be varied within wide ranges and to any polygonal cross sectional form.

Figure 7:
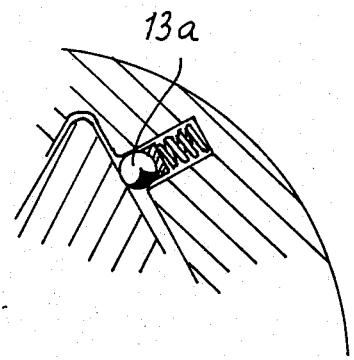

FIG. 7 indicates a possibility of using a large number of separate rolling means in the form of balls each provided in a guide bore and each having a spring and a ball carrier.

I claim:

1. A torque transmitting apparatus comprising a first element (2) and a second element (1) telescopically connected to rotate in common and axially translate relative to each other for play-free axial translation and torque transmission therebetween, said first element (2) including a bore having a polygonal cross-section defined by inner surfaces, said second member (1) having a polygonal cross-section defined by outer surfaces, each of said outer surfaces and an associated one of said inner surfaces forming a pair of cooperating surfaces, one of said cooperating surfaces of each pair having at least three sections including a central section defining a groove (4) narrower than the other of the cooperating surfaces and outer sections (5, 6) which cooperate with matching outer sections (9a) of said other of said cooperating surfaces (9), and rolling element means for supporting said second element (1) within said bore defined by said first element (2) for play-free axial movement relative to said first element (2) and play-free transmission of torque of predetermined magnitude between said first element (2) and said second element (1) and including a plurality of rolling element assemblies, each rolling element assembly being disposed between an associated pair of cooperating surfaces and partially disposed within said groove (4) associated therewith, said rolling element assembly including at least one bed (7), means (12) for restraining said bed (7) against axial movement relative to one of said elements comprising said first element (2) and said second element (1), a plurality of rolling elements (10 or 13) disposed between and in rolling contact with said one bed (7) and one of said cooperating surfaces of said associated pair, and spring biasing means (8) acting between the other of said cooperating surfaces of said associated pair and said bed (7) for biasing said bed (7) toward said one cooperating surface of said associated pair, said spring biasing means (8) having a spring force calculated to transmit torque up to a predetermined magnitude through said rolling element assembly from one of said elements comprising said first and second elements (2, 1) to the other of said elements comprising said first and second elements (2, 1) said outer sections (5, 6) being forced into direct contact with said matching outer sections (9a) by torque applied between said elements in excess of said perdetermined magnitude whereby said rolling element assemblies are protected from overloading.

2. Apparatus according to claim 1, characterized in that said biasing means comprise plate springs (8) fixedly mounted in spaced apart relation to each other.

3. Apparatus according to claim 1 wherein said rolling elements comprise balls (13a) and said apparatus includes means for urging said balls in opposite directions toward the respective side walls of said groove (4).

4. Apparatus according to claim 3 wherein said means for urging said balls comprises inclined surfaces on said bed (4).

5. Apparatus according to claim 4 wherein said first element comprises a sleeve (2) and said one of said cooperating surfaces of each pair is defined by said sleeve.

6. Apparatus according to claim 5 wherein said first element comprises a sleeve (2) and said second element comprises a shaft (1) and said means for urging said balls is further characterized as means for urging said balls toward said shaft (1).

7. Apparatus according to claim 5 wherein said first element comprises a sleeve (2) and said second element comprises a shaft (1) and said means for urging said balls is further characterized as means for urging said balls toward said sleeve.

8. Torque transmitting apparatus comprising first and second axially elongated elements (2,1) telescopically connected to coaxially rotate in unison and axially translate relative to each other for play-free axial displacement and torque transmission therebetween, said first element (2) including an axially extending bore (3) having a polygonal cross-section defined by a plurality of inner surfaces, said second element (1) having a portion thereof received within and generally complementing associated portions of said bore (3) and including a polygonal cross-section defined by a plurality of outer surfaces, each of said inner surfaces being disposed in opposing relation to and cooperating with an associated one of said outer surfaces to define a pair of cooperating surfaces, one of said cooperating surfaces comprising said pair defining a groove (4) opening toward the other of the surfaces comprising said pair of surfaces, and rolling means disposed within said bore for maintaining said first and second elements (2, 1) in coaxial alignment to axially translate relative to each other and transmit torque of predetermined magnitude between said two elements (2, 1) and including a plurality of rolling element assemblies, each of said assemblies being disposed between an associated pair of cooperating surfaces and partially contained within said groove defined by said one cooperating surface of said associated pair and including a bed (7), means (12) for restraining said bed against axial movement relative to one of said elements comprising said first and second elements (2, 1), a plurality of rolling elements (10 or 13) disposed in rolling engagement with said bed (7) and one of said cooperating surfaces comprising said associated pair, and biasing means (8) acting between said bed (7) and the other of said cooperating surfaces comprising said associated pair, said biasing means (8) having a biasing force calculated to transmit torque of said predetermined magnitude from one of said elements comprising said first and second elements (2, 1) through said roller assemblies to the other of said elements comprising said first and second elements (2, 1) and to permit co-engagement of associated portions of said inner and outer surfaces in response to torque in excess of said predetermined magnitude whereby to prevent overloading of said rolling element assemblies.

9. A torque transmitting apparatus comprising a first element (2) and a second element (1) telescopically connected to rotate in common and axially translate relative to each other for play-free axial translation and torque transmission therebetween, said first element (2) including a bore having a polygonal cross-section defined by inner surfaces, said second member (1) having a polygonal cross-section defined by outer surfaces, each of said outer surfaces and an associated one of said inner surfaces forming a pair of cooperating surfaces, one of said cooperating surfaces of each pair having at least three sections including a central section defining a groove (4) narrower than the other of the cooperating surfaces and outer sections (5, 6) which cooperates with matching outer sections (9a) of said other of said cooperating surfaces, and rolling element means for supporting said second element (1) within said bore defined by said first element (2) for play-free axial movement relative to said first element (2) and play-free transmission of torque of predetermined magnitude between said first element (2) and said second element (1) and including a plurality of rolling element assemblies, each rolling element assembly being disposed between an associated pair of cooperating surfaces and partially disposed within said groove (4) associated therewith, said rolling element assembly including at least one bed (7) having inclined surfaces thereon, means (12) for restraining said bed (7) against movement in an axial direction relative to one of said elements comprising said first element (2) and said second element (1), a plurality of balls (10 or 13) disposed between and in rolling contact with said inclined surfaces of said one bed (7) and one of said cooperating surfaces of said associated pair, and spring biasing means (8) acting between the other of said cooperating surfaces of said associated pair and said one bed (7) for biasing said one bed (7) toward said one cooperating surface of said associated pair, each of said inclined surfaces cooperating with said balls in rolling engagement therewith to urge the latter said balls outwardly and into rolling engagement with an associated one of the sidewalls of said groove (4), said spring biasing means (8) having a spring force calculated to transmit torque up to a predetermined magnitude through said rolling element assembly from one of said elements comprising said first and second elements (2, 1) to the other of said elements comprising said first and second elements (2, 1), said outer sections (5, 6) being forced into direct contact with said matching outer sections (9a) by torque applied between said elements in excess of said predetermined magnitude whereby said rolling element assemblies are protected from overloading.

* * * * *